US005506606A

United States Patent [19]

Saikawa et al.

[11] Patent Number: 5,506,606

[45] Date of Patent: Apr. 9, 1996

[54] RECORD APPARATUS

[75] Inventors: Satoshi Saikawa, Inagi; Tetsuo Suzuki, Yokohama; Soichi Hiramatsu, Yokohama; Haruyuki Yanagi, Yokohama; Takashi Nojima, Tokyo, all of Japan

[73] Assignee: Canon Kabushiki Kaisha, Tokyo, Japan

[21] Appl. No.: 479,832

[22] Filed: Jun. 7, 1995

Related U.S. Application Data

[63] Continuation of Ser. No. 921,332, Jul. 29, 1992, abandoned.

[30] Foreign Application Priority Data

Aug. 2, 1991 [JP] Japan .................................... 3-217934

[51] Int. Cl.[6] .............................. G06K 15/00; B41J 11/02

[52] U.S. Cl. .......................... 346/134; 347/104; 400/624; 400/625

[58] Field of Search ........................... 346/134; 347/104; 400/624, 625, 629; 271/3.01

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,723,129 | 2/1988 | Endo et al. . |
| 4,740,796 | 4/1988 | Endo et al. . |
| 4,991,828 | 2/1991 | Mizoguchi ................................. 271/3 |
| 5,120,038 | 6/1992 | Takimoto et al. .......................... 271/3 |
| 5,152,618 | 10/1992 | Goodwin et al. ....................... 400/120 |

FOREIGN PATENT DOCUMENTS

| | | |
|---|---|---|
| 0409596 | 1/1991 | European Pat. Off. . |
| 54-056847 | 5/1979 | Japan . |
| 56-010472 | 2/1981 | Japan . |
| 59-123670 | 7/1984 | Japan . |
| 59-138461 | 8/1984 | Japan . |
| 60-071260 | 4/1985 | Japan . |
| 1317775 | 12/1989 | Japan . |

*Primary Examiner*—Benjamin R. Fuller
*Assistant Examiner*—Craig A. Hallacher
*Attorney, Agent, or Firm*—Fitzpatrick, Cella, Harper & Scinto

[57] ABSTRACT

A recording apparatus comprises a recording device for recording an image on a recording medium, a transport device for transporting the recording medium past an area at which the recording device is provided, a platen provided in the area for supporting the recording medium, and a bearing provided in the platen for fitting therein a shaft of a transport roller of the transport device.

22 Claims, 5 Drawing Sheets

RECORD APPARATUS

This application is a continuation of application Ser. No. 07/921,332 filed Jul. 29, 1992, now abandoned.

BACKGROUND OF THE INVENTION

1. Field of the Invention

The present invention relates to a recording apparatus for recording an image on a recording medium by recording means, and more particularly to a recording apparatus having a transport mechanism for transporting a recording medium.

2. Related Background Art

A recording apparatus having a function of a printer, a copier or a facsimile device or which is used as an output device of a complex machine such as a computer and a word processor, or a work station is constructed to record an image on a recording medium such as a paper sheet or a plastic sheet (OHP sheet) in accordance with image information. The recording apparatus is categorized by its recording method of the recording means thereof into ink jet type, wire dot type, thermal type, thermal transfer type and laser beam type.

In a serial type recording apparatus which adopts a recording method of main scanning orthogonally to the direction of transport of the recording medium (sub-scan direction), the recording medium is set at a predetermined record position and then an image is recorded (main scan) by the recording means (a recording head) mounted on a carriage which moves along the recording medium, and after one line of recording, the recording medium is fed (sub-scan) by a predetermined amount and the image of the next line is recorded (main-scan). This process is repeated to record the entire image on the recording medium. On the other hand, in a line type recording apparatus which records an image by only the sub-scan, that is, the feeding of the recording medium along the transport direction, the recording medium is set at a predetermined record position, one line of image is recorded at one time, the recording medium is fed by a predetermined amount (pitch feed) and then the image of the next line is recorded at one time. This process is repeated to record the entire image on the recording medium.

The ink jet recording apparatus records the image by discharging ink to the recording medium from the recording means (a recording head). It can reduce a size of the recording means, can record a fine image at a high speed, can record without requiring special processing to a plain paper, is inexpensive in a running cost, is of low noise because this of a non-impact type, and can easily record a color image by using multi-color inks.

The ink jet .type recording means (recording head) for discharging ink by utilizing a thermal energy can be readily manufactured to have a high density liquid path arrangement (discharge port arrangement) by forming an electro-thermal converter, electrodes, liquid path walls and a ceiling on a substrate by a semiconductor manufacturing process including etching, vapor deposition and sputtering so that further compaction of the apparatus is attained.

In the above recording apparatus, when the recording medium such as paper sheet or plastic sheet is to be transported (fed) in front of the recording means (recording head), it is necessary to present an error in the record position and the deformation of the recording medium. In the ink jet recording apparatus, it is necessary to prevent the contact of the recording head to the recording medium. To this end, a platen for supporting the recording medium is arranged to oppose to the recording head and a pair of rollers (usually a sheet ejection roller pair) having a transport speed equal to or slightly higher than that of the main transport unit are arranged downstream of the recording head as viewed in the transport direction in order to eliminate the relaxation of the recording medium.

As for the platen, it is necessary to maintain high precision parallelism between the platen (which supports the recording medium) and the outer peripheries of the transport roller (sheet feed rollers) in order to prevent the twist of the recording medium when it is fed. In the ink jet recording apparatus, in order to prevent the recording medium from contacting to the recording head and maintain the recording precision, it is required to keep a gap between the recording medium and the recording head (discharge port formation plane) (hereinafter referred to as a sheet gap) at minimum and constant. Thus, in the platen for-supporting the recording medium to keep the sheet gap constant, it is required to strictly control the position precision of mounting, planarity and warp. As a result, severe precision of the platen itself is required and the strict control to the platen assembly process is required.

In the prior art recording apparatus, however, since the platen is mounted on a frame member which pivotably supports the transport rollers, the assembly precision of the platen is significantly affected by the precision of the frame member.

SUMMARY OF THE INVENTION

In the light of the above technical problems, it is an object of the present invention to provide a compact recording apparatus having a high recording quality.

It is another object of the present invention to provide a recording apparatus which improves the assembly precision of the platen without being affected by the precision of the frame member.

It is other object of the present invention to provide a recording apparatus comprising recording means for recording an image on a recording medium, transport means for transporting the recording medium through a record station, a platen for supporting the recording medium at the record station, and a bearing for a transport roller formed in the platen to receive a shaft of the transport roller.

BRIEF DESCRIPTION OF THE DRAWINGS v FIG. 1 shows a perspective view, of a portion of one embodiment of the recording apparatus of the present invention, FIG. 2 shows a partial perspective view of a structure of an ink discharge unit of recording means of FIG. 1, FIG. 3 shows a side view of the embodiment of the recording apparatus of the present invention, FIG. 4 shows a longitudinal sectional view of the embodiment of the recording apparatus of the present invention, and FIG. 5 shows a plan view of the embodiment of the recording apparatus of the present invention.

DETAILED DESCRIPTION OF THE PREFERRED EMBODIMENTS

Figure 1:
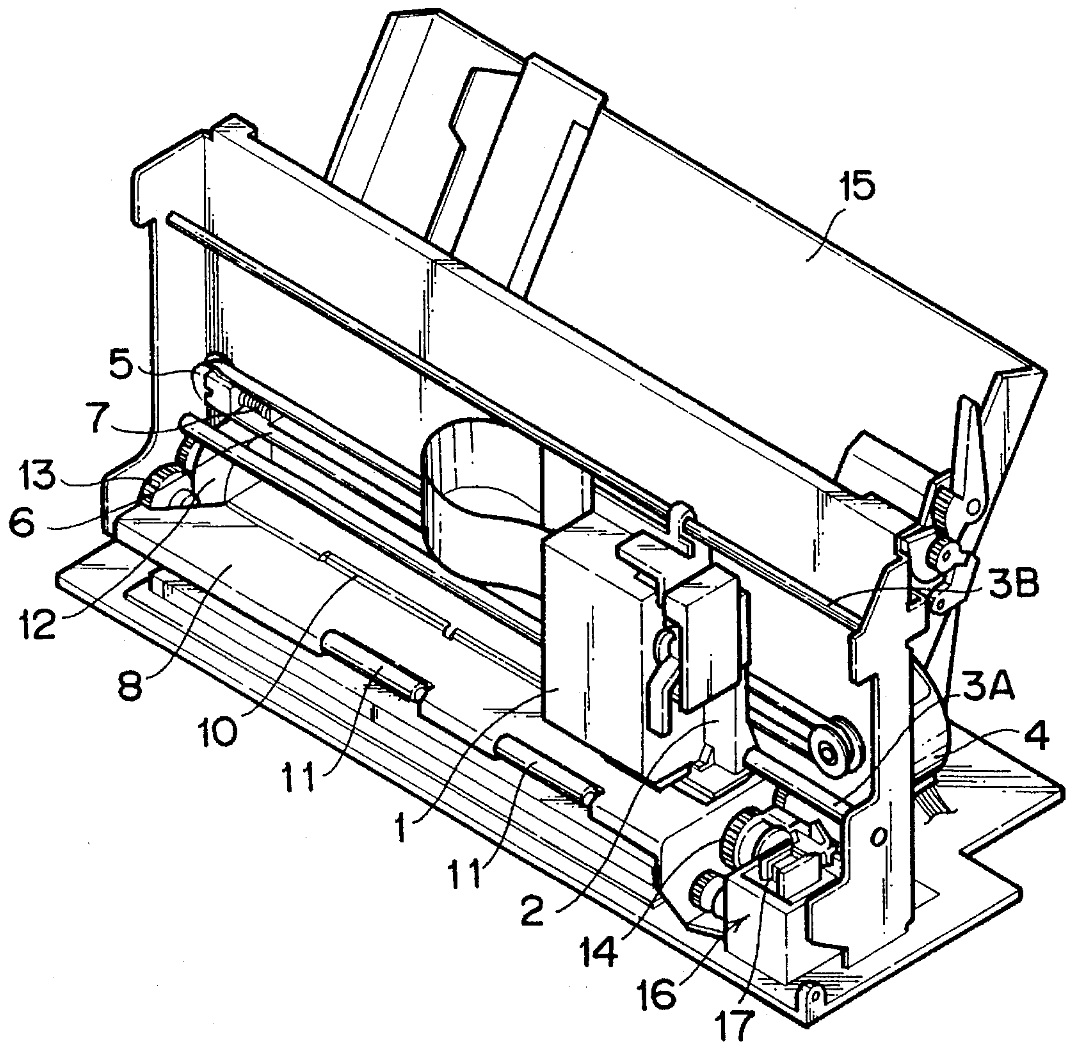

An embodiment of the present invention is now explained with reference to the drawings. FIG. 1 shows a perspective view of a portion of an embodiment of the recording apparatus of the present invention. In the present embodiment, the recording apparatus is an ink jet recording apparatus. In FIG. 1, recording means (record head) 1 is mounted on a carriage 2 which is supported and guided by two guide rails 3A and 3B arranged in a body of the apparatus to permit reciprocal movement of the carriage 2 along a main scan direction. A carriage motor 4 for driving the carriage 2 is mounted at an end of the body and an idler pulley 5 is arranged at the other end. A timing belt 6 is spanned between the carriage motor 4 and the idler pulley 5 in parallel to the guide rails 3A and 3B and a portion of the timing belt 6 is coupled to the carriage 2. A predetermined tension is imparted to the timing belt 6 by a tension spring 7 provided at the idler pulley 5.

The carriage 2 is forwardly and backwardly driven by the forward rotation and the backward rotation of the carriage motor 4, and the position of the carriage 2 (the position of the recording head 1) is controlled by the rotation of the carriage motor 4. An image is recorded by discharging ink from a discharge port of the record head 1 toward a recording medium 21 (FIGS. 3 and 4) during the movement of the carriage 2. The recording means (record head) 1 of the present embodiment is constructed by an exchangeable ink cartridge which includes an ink tank for supplying the discharge ink.

The record head 1 is an ink jet recording means which discharges the ink by utilizing thermal energy and is provided with an electro-thermal converter for generating the thermal energy. The record head 1 10 discharges the ink from the discharge port for recording the image by utilizing a change in pressure caused by growth-and contraction of bubbles by film boiling caused by the thermal energy applied by the electro-thermal converter.

Figure 2:
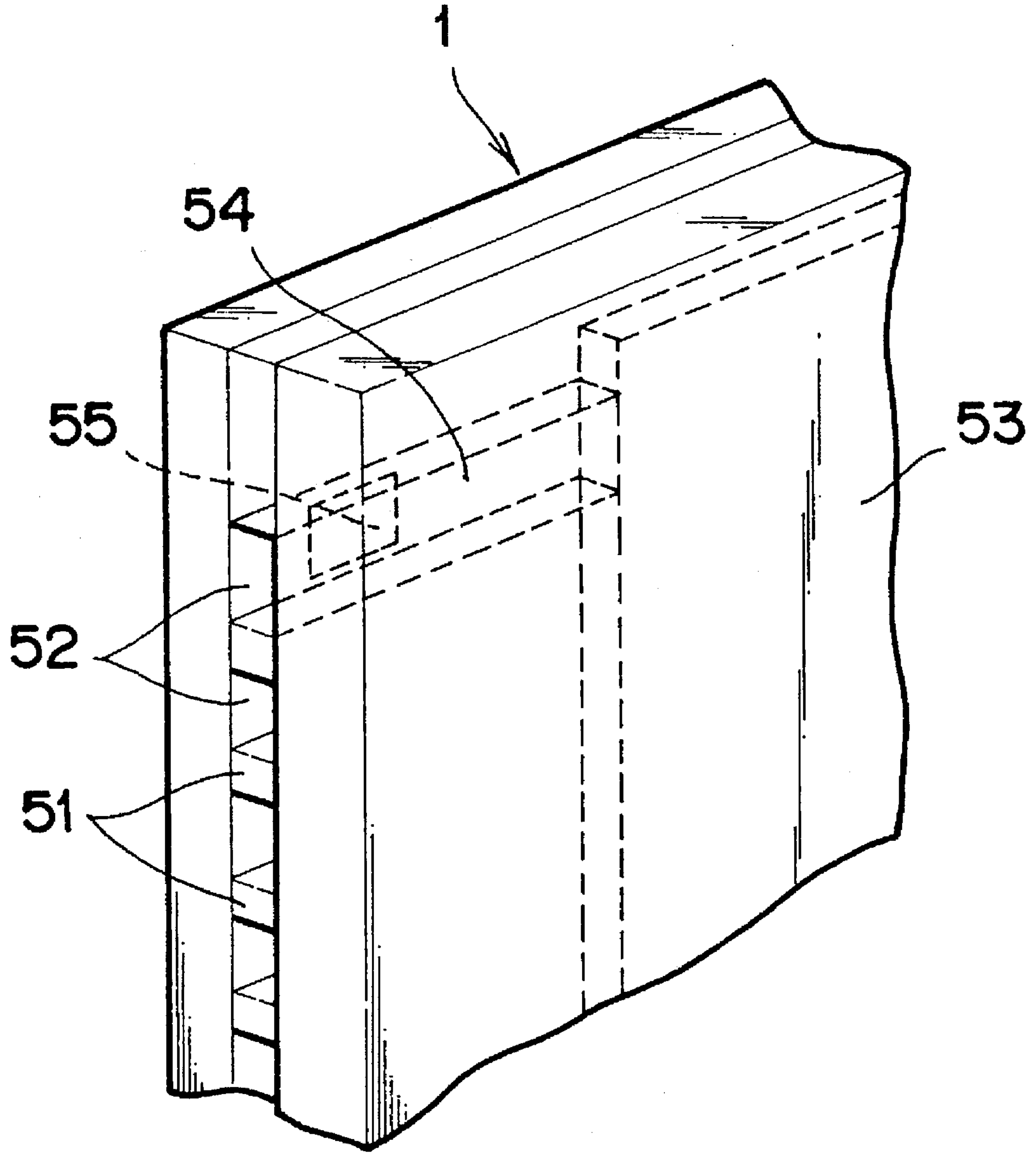

FIG. 2 shows a partial perspective view of a structure of an ink discharge unit of the recording means (record head) 1. In FIG. 2, a plurality of discharge ports 52 are formed at a predetermined pitch on a discharge port forming plane 51 which faces the recording medium with a predetermined gap (for example, approximately 0.5–2.0 mm) therebetween, and electro-thermal converters (heat generating resistors) 55 for generating the ink discharging energy are arranged along walls of liquid paths 54 which are connected to a common liquid chamber 53 and the discharge ports 52. In the present embodiment, the discharge ports 52 are mounted on the carriage 2 such that they align along the orthogonal direction to the scan direction of the carriage 2. The electro-thermal converter 55 is driven (energized) by the image signal or the discharge signal so that the ink in the liquid path 54 is boiled and the ink is discharged from the discharge port 52 by the pressure generated by boiling.

Figure 3:
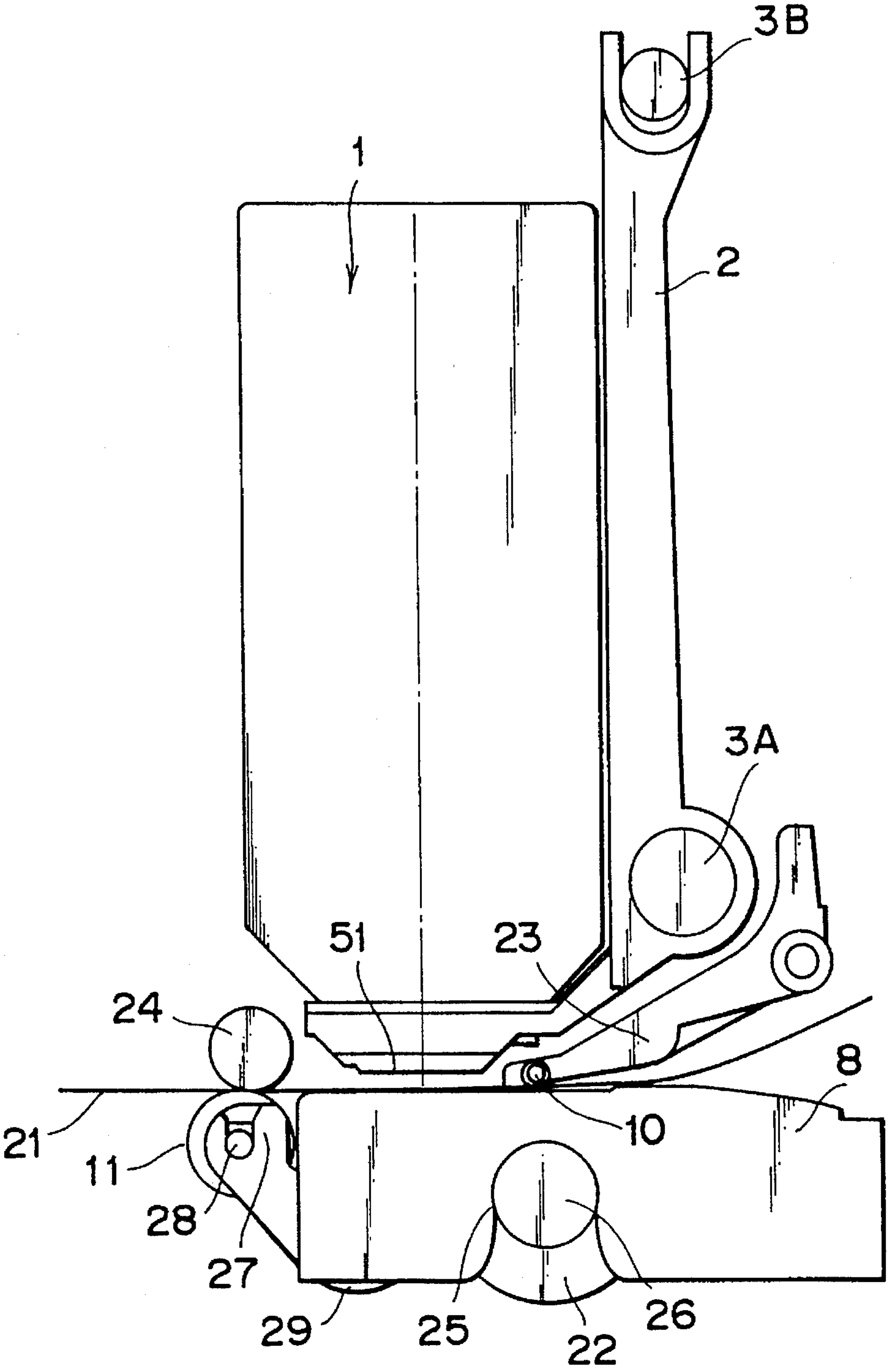
Figure 4:
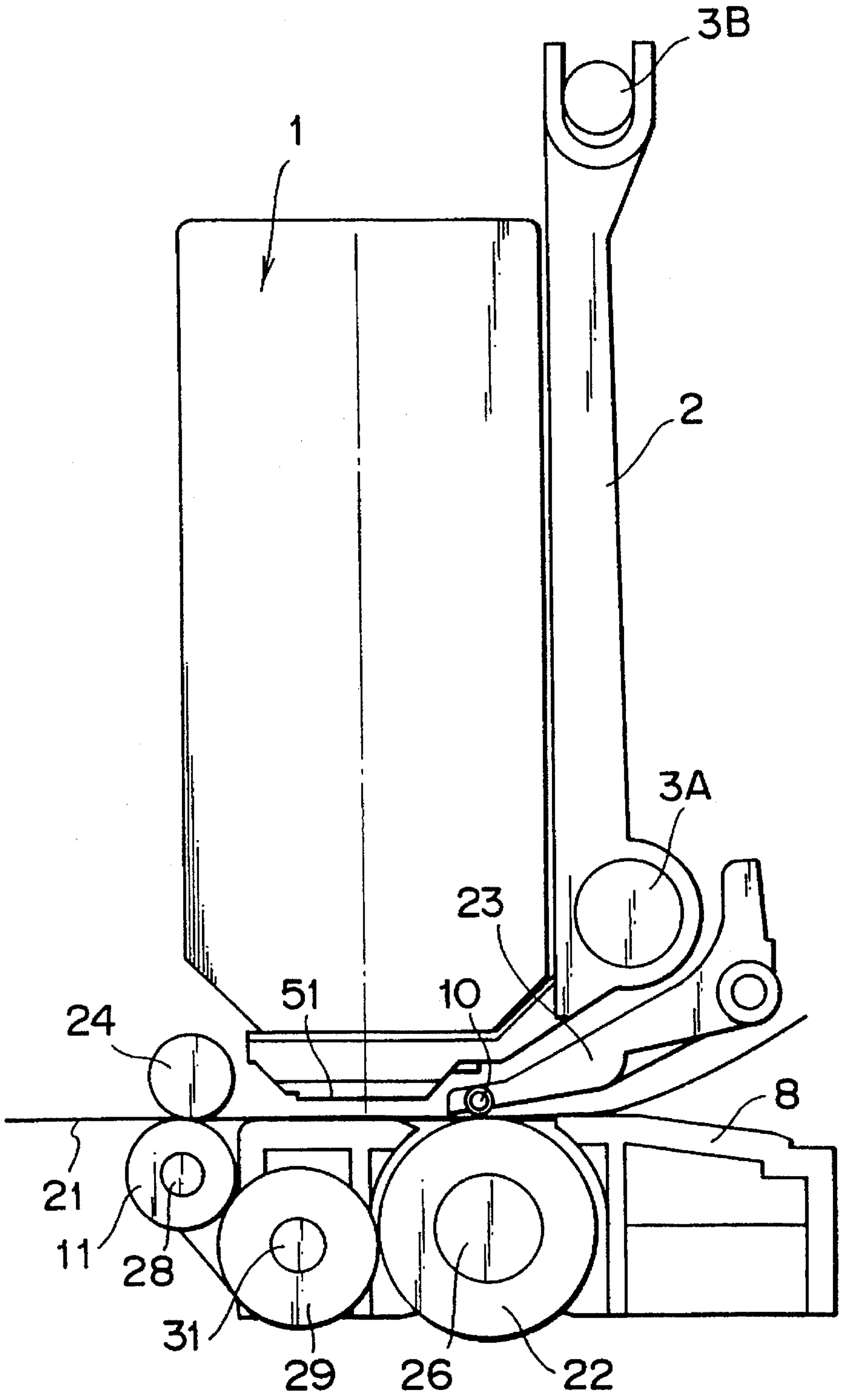
Figure 5:
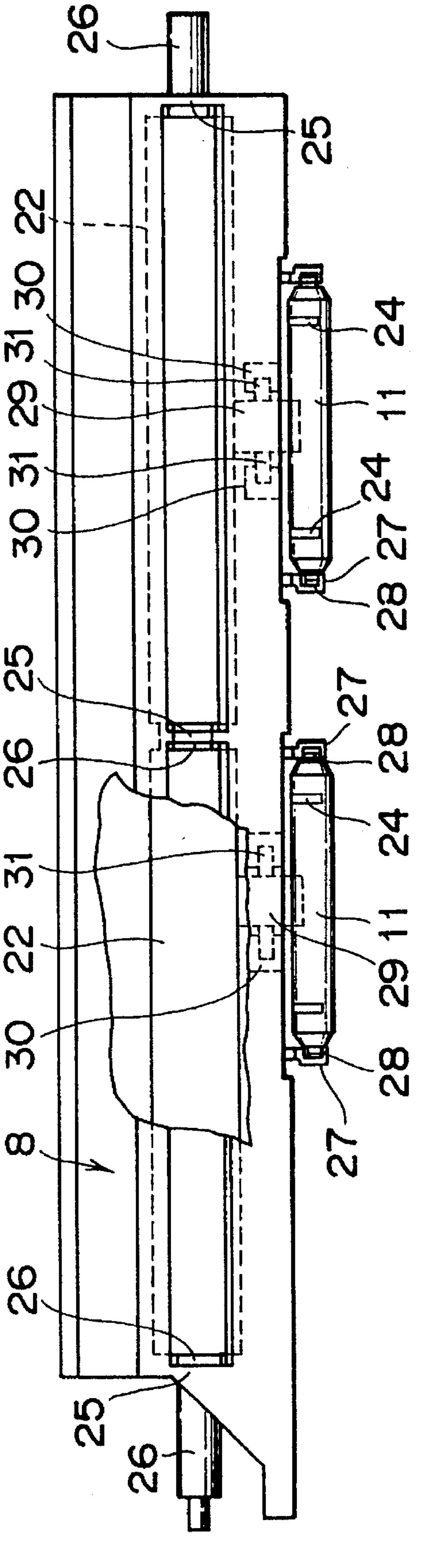

FIG. 3 shows a partial side view of the embodiment of the present invention, FIG. 4 shows a partial sectional view of the embodiment of the present invention, and FIG. 5 shows a partial plan view of the embodiment of the present invention. In FIGS. 1 and 3–5, a platen 8 having a length to substantially cover the width of the recording medium 21 is arranged in parallel to the guide rails 3A and 3B at a position opposing to the ink discharge unit of the record head 1. The platen 8 has a function of holding the recording medium 21 at a right record position, preventing the deformation of the recording medium 21 and maintaining a proper gap between the recording medium 21 and the ink discharge unit. A transport roller 22 is arranged in parallel to the guide rails (carriage guide shafts) 3A and 3B upstream of the record position of the platen 8 as viewed along the direction of sheet transport.

A pinch roller 10 rotatably pivoted to a pinch roller holder 23 is press-contacted to the transport roller 22 so that the recording medium 4 fed from an automatic sheet feeder 15 is transported to the record position (which faces the discharge port forming plane 51) by the transport roller 22 and the pinch roller 10. The pinch roller 10 is press-contacted to the transport roller 22 to make follow-rotation, and the contact force of the pinch roller 10 is imparted by a leaf spring through the pinch roller holder 23.

An ejection roller 11 and a spur 24 for ejecting the recording medium 21 fed from the record station are arranged downstream of the record station of the platen 8 as viewed along the direction of the transport of the sheet. Again, the recording medium is fed out by a frictional transport force between the ejection roller 11 and the spur 24. The spur 24 is press-contacted by the ejection roller 11 to make follow-rotation and the contact force of the spur 24 is imparted by a leaf spring through a spur holder not shown. The pinch roller 10 and the spur 24 may be separated by the manipulation of a lever when the recording medium 21 is to be taken out when it jams.

The ejection roller 11 has a function of eliminating the relaxation of the recording medium 21 (FIG. 4) when it is transported in front of the record head 1 and preventing an error in the record position and the contact of the recording medium 21 to the record head 1. The ejection roller 11 is usually driven in synchronism with the transport roller 22 and a peripheral velocity thereof is set to be slightly higher than that of the transport roller 22.

In FIG. 1, a recovery unit 16 is arranged on the right of the platen 8 beyond the recording area. A cap 17 for sealing the ink discharge unit of the record head 1 is provided in the recovery unit 16. The recovery unit 16 recovers the ink discharge ability of the record head 1 by generating a negative pressure in the cap 17 by a suction pump while the ink discharge unit is sealed so that high viscosity ink and adhered ink in the discharge ports of the record head 1 are sucked out. The automatic sheet feeder 15, the transport roller 22 (FIG. 4), the ejection roller 11 and the recovery unit 16 are driven by a transport motor (sheet feed motor) 12 through gear trains 13 and 14 and a clutch not shown.

A principal portion of the present invention is now explained with reference to FIGS. 3 to 5. In FIGS. 3 to 5, a bearing 25 for the transport roller 22 is formed in the platen 8, and the bearing 25 is fitted in a shaft 26 of the transport roller 22. As shown in FIG. 5, the bearings 25 are formed at three points along the length of the platen 8, that is, at left and right ends and a center. Accordingly, the bearings 25 are fitted in the shaft 26 of the transport roller 22 at three points. In the present embodiment, the bearings 25 are open at the bottoms so that the platen 8 may be fitted to the shaft 26 of the transport roller 22 from the top thereof. In this manner, the platen 8 is exactly held at the predetermined position in the vicinity of the transport roller 22. Since it is necessary to prevent the rotation of the platen 8 with respect to the 10 transport roller 22, projections (not shown) protruding from the opposite end-s of the platen 8 are fitted to side walls (not shown) of the body to prevent the rotation of the platen 8.

In FIGS. 3 to 5, a bearing 27 for the ejection roller 11 is formed in the platen 8 and it is fitted to a shaft 28 of the ejection roller 11. As shown in FIG. 5, the bearings 27 are formed at four points on the platen 8 for the opposite ends of the two ejection rollers 11. Accordingly, the ejection rollers 11 are pivoted with their end shafts 28 fitted to the bearings 27.

In FIGS. 3 to 5, a transmission roller 29 is provided to transmit a rotation drive force of the transport roller 22 to the ejection roller 11. Two transmission rollers 29 are provided for the ejection rollers 11. Bearings 30 for the transmission rollers 29 are formed in the platen 8 and they fit to shafts 31 of the transmission rollers 29. The transmission rollers 29 are press-contacted to the transport rollers 22 and the ejection rollers 11 by springs (compression springs) not shown which bias the shafts 31. The bearings 30 of the platen 8 are elongated in order to movably pivot the transmission rollers 29 in the direction of contact and separation.

In the present embodiment, since the bearings 25 which are fitted to the shaft 26 of the transport 10 roller 22 at three points of the platen 8, that is, the left and right ends and the center, the platen 8 is positioned and the warp is corrected. Four or more bearings 25 may be provided. The more the number of bearings 25 is, the higher is the holding force of the platen 8 and the higher is the strength of the platen 8. Where one or two bearings 25 are used, the positioning and the strength enhancement are similarly attained.

As described above, since the bearing 25 for the transport roller 22 is provided in the platen 8 and the bearing 25 is fitted to the shaft 26 of the transport roller 22, the position precision of the platen 8 when it is assembled is improved and the warp (particularly vertical warp) of the platen 8 is corrected by fixing the platen 8 along the transport roller 22. As a result, the positional relation between the outer periphery of the transport roller 22 which transports (feeds) the recording medium 21 and the sheet feed plane (platen plane) of the platen 8 can be correctly maintained and the precision of the planarity of the platen plane is improved. In the ink jet recording apparatus, the gap between the discharge port forming plane 51 and the recording medium 21 can be exactly maintained.

Further, since the portion of the recording medium 21 which faces the record head 21 follows the platen plane of the platen 8, the deformation of the recording medium 21 is prevented and the error in the record position is eliminated. Further, since the bearings for the transport roller 22, the ejection roller 11 and the transmission roller 29 are formed in the platen 8, the size and the weight of the recording apparatus can be reduced, the control of the position precision between the platen 8 and the rollers is facilitated and the deviation of the shafts of the rollers is reduced.

In the present embodiment, the present invention is applied to the ink jet recording apparatus although the present invention is applicable to various recording apparatus such as a wire dot recording apparatus, a laser beam recording apparatus and a thermal transfer recording apparatus, without regard to the recording method of the recording apparatus and similar effects are attainable. In the present embodiment, the serial type ink jet recording apparatus in which the recording means (record head) is mounted on the carriage 2 and main-scanned along the recording medium 4 is described although the present invention is equally applicable to a line type ink jet recording apparatus which uses line type recording means to cover the entire or a portion of record width of the recording medium and a similar effect is attainable.

In the present embodiment, a monochromatic ink jet recording apparatus which uses one record head is described although the present invention is applicable to a color ink jet recording apparatus which uses a plurality of record heads for recording by different colors of inks, or a multi-tone ink jet recording apparatus which uses a plurality of recording heads for recording with different densities of monochromatic ink, without regard to the number of record heads, and a similar effect is attainable.

The recording means (record head) 1 may be of cartridge type in which the record head and the ink tank are integral, or of separate type in which the record head and the ink tank are separate and interconnected by an ink feed tube. Thus, the present invention is applicable without regard to the construction of the recording means and the ink tank and a similar effect is attainable.

When the present invention is applied to the ink jet recording apparatus, the recording means (record head) may use an electro-mechanical converter such as a piezo-electric element. The present invention is particularly effective in the ink jet recording apparatus which uses the recording means which discharges the ink by utilizing the thermal energy because high density recording with high resolution is attained thereby.

Typical construction and principle thereof are disclosed in U.S. Pat. No. 4,723,129 and U.S. Pat. No. 4,740,796. It is applicable to either a so-called on-demand type or a continuous type. In the on-demand type, at least one drive signal which corresponds to record information and imparts a rapid temperature rise over the nucleate boiling point is applied to the electro-thermal converters which are arranged one for each of the sheet or the liquid paths in which the liquid (ink) is held, to generate a thermal energy in the electro-thermal converter to cause the boiling on the thermal action plane of the recording means (record head). As a result, bubbles of the liquid (ink) are formed in accordance with the drive signal.

The liquid (ink) is discharged from the discharge port by the growth and contraction of the bubbles to form at least one droplet. Where the drive signal is pulsive, the growth and contraction of the bubbles are done instantly and properly so that the high response liquid (ink) discharge is attained. The pulsive drive signal may be one disclosed in U.S. Pat. No. 4,463,359 or U.S. Pat. No. 4,345,262. Further improved recording may be attained when the condition described in U.S. Pat. No. 4,313,124 relating to the temperature rise rate on the thermal action plane is used.

The record head may comprise a combination of the discharge ports, the liquid paths and the electro-thermal converters (linear liquid paths or orthogonal liquid paths), or it may be constructed as shown in U.S. Pat. No. 4,558,333 in which the thermal action plane is arranged on a curved area, or as shown in U.S. Pat. No. 4,459,609. Further, it may be constructed as shown in Japanese Patent Application Laid-Open No. 59-123670 in which a slit common to a plurality of electro-thermal converters is used as a discharge unit of the electro-thermal converters, or as shown in Japanese Patent Application Laid-Open No. 59-138461 in which an aperture for absorbing a pressure wave of the thermal energy is used as a discharge unit. Whatever the construction of the record head, the present invention can attain the recording in a correct and efficient manner.

The present invention is also effective to a full line type record head having a length corresponding to a maximum width of the recording medium which the recording apparatus can record on. Such a record head may meet the length condition by a combination of a plurality of record heads or a single head which is constructed in one unit. In case of the serial type, the present invention is effective with a record head fixed to the body of the apparatus, an exchangeable chip type record head which attains electrical connection with the body of the apparatus and the supply of ink from the body when 10 it is mounted on the body, or a cartridge type recording head having the ink tank integrally formed in the record head.

The addition of recovery means for the record head and other auxiliary means provided in the recording apparatus of the present invention are preferable because they further stabilize the effects of the present invention. More specifically, capping means and cleaning means of the record head, pressurizing means, suction means, electro-thermal converter or other heating device or a combination thereof as preliminary heating means, and means for preliminary discharge mode for effecting the discharge other than the recording are effective to stabilize recording.

As to the type and the number of record heads to be mounted, only one record head may be provided for monochromatic ink, or a plurality of record heads may be provided for different ink colors or densities. For example, the record mode of the recording apparatus may be either a record mode by a primary color such as black, or multi-color with a plurality of colors or full color by color mixture, with an integral head or a combination of heads.

In the embodiment of the present invention, the ink is liquid, although it may be ink which is solidified at or lower than room temperature, or ink which is softened or liquefied at room temperature. In the ink jet recording apparatus, since it is common to temperature control the ink within a range between 30° C. and 70° C. to maintain the viscosity of the ink in a stable discharge range, ink which is liquefied when a record signal is applied may be used. Further, the present invention is also applicable where the temperature rise by the thermal energy is prevented by the use of energy of state change from the solid state to the liquid state of the ink or where ink which is solidified when it is left is used in order to prevent the evaporation of the ink so that the ink is liquefied by the thermal energy but it is solidified before it reaches the recording medium or the ink is liquefied by the application of the thermal energy corresponding to the record signal and the liquid ink is discharged.

The ink for this purpose may be held to face the electro-thermal converter while it is held in recesses of a porous sheet or through holes in solid state or liquid state as described in Japanese Patent Application Laid-Open Nos. 54-56847 or 60-712620. In the present invention, the film boiling system described above is most effective to the inks described above.

The ink jet recording apparatus of the present invention may be used as an image output terminal of a computer, a copying machine combined with a reader, or a facsimile device having a transmission and reception function.

In accordance with the present embodiment, since the bearing for the transport roller is provided in the platen and it is fitted to the shaft of the transport roller, the position precision of the assembled platen is improved, and the variation of the position of the platen is prevented. Further, since the platen is fixed in parallel to the transport roller, the vertical warp along the longitudinal direction of the platen can be corrected. Further, since the bearing of the platen is fitted to the shaft of the transport roller and the ejection roller is supported by the platen, the deviation between the shafts of the rollers is reduced and the control of the position precision between the platen plane and the transport roller and the peripheral plane of the ejection roller is facilitated.

In accordance with the present invention which provides the recording apparatus comprising the recording means for recording an image on the recording medium, the transport means for transporting the recording medium past the record unit and the platen for supporting the recording medium in the record unit, the bearing is provided in the platen and it is fitted to the shaft of the transport roller. Accordingly, the assembly precision of the platen is improved without being affected by the precision of the frame member and the recording apparatus which can exactly define the position of the recording medium in the record unit is provided.

What is claimed is:

1. An information recording apparatus for recording information on a sheet member by using a head member located at an information recording area, said apparatus comprising:

a conveying roller for conveying a sheet member said conveying roller having a shaft portion;

a recording device housing having a positioning section, said positioning section for supporting and positioning said shaft portion of said conveying roller; and a platen having a surface at a position corresponding to the information recording area and a support receiving portion for receiving support from said shaft portion of said conveying roller.

2. An apparatus according to claim 1, wherein said platen is rotatably supported about said shaft portion.

3. An apparatus according to claim 1, wherein said conveying roller and said platen are located on a same side of a sheet member conveyance route on which the sheet member is conveyed.

4. An apparatus according to claim 1, wherein a plurality of said support receiving portions are provided on said platen and at least one of said support receiving portions is supported on the shaft portion at both ends of said conveying roller.

5. An apparatus according to claim 1, wherein said conveying roller comprises a plurality of conveying surfaces divided in an axial direction and a plurality of support receiving portions are provided to be supported by said shaft portion at both ends of said conveying roller, said divided conveying surfaces being located between said support receiving portions.

6. An apparatus according to claim 1, wherein said platen is supported by said shaft portion to maintain a predetermined distance between said surface of said platen and the head member.

7. An apparatus according to claim 1, wherein said support receiving portion of said platen comprises a bearing fitted above and onto said shaft portion of said conveying roller.

8. An apparatus according to claim 1, wherein said recording device housing comprises a limiting section for limiting the rotation of said platen around said shaft portion of said conveying roller.

9. An apparatus according to claim 8, wherein said limiting section is fitted into a projection portion projecting in an axial direction of said conveying roller.

10. An apparatus according to claim 1, wherein said conveying roller is provided upstream of the information recording area with respect to a conveyance direction of the sheet member.

11. An apparatus according to claim 1, wherein said platen comprises an exhausting roller support portion for supporting an exhausting roller for exhausting the sheet member downstream of the information recording area with respect to a conveyance direction of said sheet member.

12. An apparatus according to claim 1, wherein said surface of said platen guides a leading end of the sheet member in a conveyance direction at the information recording area.

13. An apparatus according to claim 1, wherein the head member comprises an ink jet recording head for discharging ink through an ink discharge port to the sheet member.

14. An apparatus according to claim 1, wherein the head member comprises an ink jet recording head including an electrothermal converting element for generating thermal energy to heat and discharge ink through an ink discharge port to the sheet member.

15. A recording apparatus for recording on a recording medium with an ink jet recording head for discharging ink through an ink discharge port, said apparatus comprising:

a recording medium conveyance route for conveying the recording medium;

a support portion for supporting the ink jet recording head at one side of said recording medium conveyance route, said support portion supporting the ink jet recording head so that the recording medium is recordable in said recording medium conveyance route opposed to a discharge port surface on which the ink discharge port of the ink jet recording head is provided;

a conveying roller located upstream of said support portion in said recording medium conveyance route and opposite to said support portion with respect to said recording medium conveyance route to convey the recording medium to an area opposed to said support portion, said conveying roller having a shaft portion;

a recording apparatus housing having a positioning section, said positioning section for supporting and positioning said shaft portion of said conveying roller; and a platen located on a same side of said conveying roller with respect to said recording medium conveyance route and having a surface opposable to said support portion, a support receiving portion supported on said shaft portion of said conveying roller and a contacting portion for contacting said recording apparatus housing and limiting rotation of said platen around said shaft portion of said conveying roller.

16. An apparatus according to claim 15, wherein said platen is rotatably supported about the shaft portion.

17. An apparatus according to claim 15, wherein said platen is supported by said shaft portion to maintain a predetermined distance between said surface of said platen and said support portion.

18. An apparatus according to claim 15, wherein said support receiving portion of said platen comprises a bearing fitted above and onto said shaft portion of said conveying roller.

19. An apparatus according to claim 15, wherein said platen further comprises an exhausting roller support portion for supporting an exhausting roller for exhausting the recording medium downstream of said support portion with respect to a conveyance direction of the recording medium.

20. An apparatus according to claim 15, wherein said surface of said platen guides a leading end of the recording medium in a conveyance direction at said support portion.

21. An apparatus according to claim 15, wherein the ink jet recording head comprises an electrothermal converting element for generating thermal energy to heat and discharge ink through the ink discharge port to the recording medium.

22. A method for supporting a plate platen of a recording apparatus, the plate platen having a bearing portion, the method comprising the steps of:

providing a housing for the recording apparatus, the housing having an engagement portion;

providing a conveyance route for a recording medium;

positioning a conveying roller, having a shaft portion, along the conveyance route by rotatably supporting the conveying roller in the housing;

fitting the bearing portion of the plate platen to the shaft portion of the conveying roller such that the plate platen is rotatably supported about the shaft portion; and limiting rotation of the plate platen by contacting the engagement portion of the housing of the recording apparatus with the plate platen.

* * * * *

CERTIFICATE OF CORRECTION

PATENT NO. : 5,506,606 Page 1 of 2

DATED : April 9, 1996

INVENTOR(S) : Satoshi SAIKAWA, et al.

It is certified that error appears in the above-indentified patent and that said Letters Patent is hereby corrected as shown below:

On the title page, item [54] and column 1, line 1, change "RECORD" to --RECORDING--.

COLUMN 1:

Line 51, "this" should read --it is--;
Line 53, ".type" should read --type--.

COLUMN 2:

Line 19, "for-supporting" should read --for supporting--;
Line 49, "v" should be deleted.

COLUMN 3:

Line 28, "10" should be deleted;
Line 30, "growth-and" should read --growth and--.

UNITED STATES PATENT AND TRADEMARK OFFICE

CERTIFICATE OF CORRECTION

PATENT NO. : 5,506,606 Page 2 of 2

DATED : April 9, 1996

INVENTOR(S) : Satoshi SAIKAWA, et al.

It is certified that error appears in the above-indentified patent and that said Letters Patent is hereby corrected as shown below:

COLUMN 4:

Line 53, "10" should be deleted;
Line 55, "end-s" should read --ends--.

COLUMN 5:

Line 10, "10" should be deleted.

COLUMN 6:

Line 63, "10" should be deleted.

COLUMN 8:

Line 7, "member" should read --member,--.

Signed and Sealed this

Third Day of September, 1996

Attest:

Bruce Lehman

BRUCE LEHMAN

*Attesting Officer*

*Commissioner of Patents and Trademarks*